United States Patent [19]

Duley et al.

[11] Patent Number: 4,879,449
[45] Date of Patent: Nov. 7, 1989

[54] MEANS OF ENHANCING LASER PROCESSING EFFICIENCY OF METALS

[76] Inventors: Walter W. Duley, P.O. Box 453, King City, Ontario, Canada, L0G 1K0; Grant Kinsman, c/o York University, 4700 Keele St., Downsview, Ontario, Canada, M3J 1P3

[21] Appl. No.: 192,921

[22] Filed: May 12, 1988

Related U.S. Application Data

[62] Division of Ser. No. 8,656, Jan. 30, 1987.

[51] Int. Cl.$^4$ .............................................. B23K 26/00
[52] U.S. Cl. ............................... 219/121.6; 2.9/121.76
[58] Field of Search ...................... 219/121.68, 121.69, 219/121.76, 121.67, 121.72, 121.63, 121.64; 428/195, 219, 192

[56] References Cited

U.S. PATENT DOCUMENTS

| | | | |
|---|---|---|---|
| 3,569,660 | 3/1971 | Houldcroft | 219/121.84 X |
| 3,932,726 | 1/1976 | Verheyen et al. | 219/121.76 X |
| 3,935,419 | 1/1976 | Lambert et al. | 219/121.76 X |
| 4,535,218 | 8/1985 | Krause et al. | 219/121.68 |
| 4,670,639 | 6/1987 | Behn | 219/121.69 |

FOREIGN PATENT DOCUMENTS

2045669 3/1979 United Kingdom .

OTHER PUBLICATIONS

Patent Abstracts of Japan, vol. 7, No. 214 (E-199) (1359), Sep. 21, 1983—Japanese Patent No. 58-10683-6(A).
Patent Abstracts of Japan, vol. 7, No. 286 (P-244) (1431), Dec. 21, 1983—Japanese Patent No. 58-1591-4(A).
Patent Abstracts of Japan, vol. 10, No. 115 (M-474) (2172), Apr. 30, 1986–Japanese Patent No. 60-24449-5(A).
Patent Abstracts of Japan, vol. 7, No. 55 (M-198) (1200), Mar. 5, 1983—Japanese Patent No. 57-20299-2(A).
W. W. Duley, *Laser Processing and Analysis of Materials*, 1983, pp. 69-78.
W. W. Duley, "Laser Material Interactions of Relevance to Metal Surface Treatment", Draper and Mazzoldi (eds.), *Laser Surface Treatment of Metals*, 1986, pp. 3-16.

*Primary Examiner*—C. L. Albritton
*Attorney, Agent, or Firm*—Fleit, Jacobson, Cohn, Price, Holman & Stern

[57] ABSTRACT

A method is described of enhancing the efficiency of laser processing of metals by preprocessing with another laser so as to define a track of reduced reflectivity.

9 Claims, 2 Drawing Sheets

MEANS OF ENHANCING LASER PROCESSING EFFICIENCY OF METALS

This is a divisional of application Ser. No. 008,656, filed Jan. 30, 1987.

This invention relates to laser processing and more particularly to preparation of a material surface for subsequent processing.

Laser processing of a material surface involves the use of laser radiation to heat the surface to temperatures at which some physical, chemical or metallurgical changes takes place. Laser radiation is absorbed by the material during processing and is converted to heat over a localized area the size of which may be controlled by some external means such as by focussing with a lens or a mirror. Typically the materials processed are metals.

Applications of lasers to drilling, cutting, welding and surface heat treatment are now well known. However, the efficiency with which laser radiation couples to the material during processing depends on the state of the surface and the physical nature of the material. When the processing laser emits in the infrared, such as for the $CO_2$ laser, metal surfaces in particular are generally highly reflecting so that only a fraction of incident radiation is absorbed and converted to heat. Thus, metals such as copper, aluminum and silver are difficult to process with infrared lasers which are the commonly available lasers with sufficient power to perform the process.

The degree of coupling of incident laser radiation to metals can be influenced by the presence of surface layers of oxide, carbide, or other materials. Such non-metallic layers or over-layers strongly absorb laser radiation and transfer heat to the underlying metal improving the overall efficiency of laser heating during cutting, welding and drilling. To improve the efficiency of laser processing, layers or coatings of energy absorbing materials are frequently applied prior to laser processing. These coatings may consist of graphite dags, silica, black paint or other compounds applied in a conventional manner. However, such application is time-consuming and the resulting efficiency of the process is dependent on the quality of the application procedure.

It is an object of the present invention to obviate or mitigate the above disadvantages.

According to one aspect of the present invention there is provided a method of preparing the surface of a material for subsequent processing by radiation of a first laser of a first wavelength by directing radiation of a second laser of a second wavelength to impinge upon said surface and decrease the reflectivity thereof to radiation of said first laser.

Preferably, the second laser exposes the surface to overlapping pulses of radiation of high intensity and short duration to promote structural and chemical change that enhances coupling when the metal is subsequently exposed to radiation from the first laser.

One effect of pre-exposure of the metal surface to high intensity, short duration pulses is to produce melting and evaportion of a thin surface layer. This yields a roughening of the surface in the localized region defined by the focal area of the second laser. A channel or groove may also be created in the material as it is preprocessed by the preporcessing laser. In addition, the high temperature generated during this irradiation results in the formation of surface compounds such as oxides that are effective absorbers of infrared and visible radiation. These compounds may be formed in the gas over the surface during irradiation and subsequently deposited on the surface. Both of these effects contribute to enhanced coupling.

Since light from the second laser can be tightly focussed, only a small area of the surface need be pretreated. Selection of this area may be facilitated by provision of a mask. This will have the effect of enabling a narrow cut or weld to be made along the path defined by the preprocessing laser. Since preprocessing with pulsed laser radiation increases absorption for subsequent radiation, this increases and enhances the efficiency of laser processing particularly of metals such as copper and aluminum whose infrared reflectivity is normally very high.

By moving the material relative to the second laser, a pattern will be produced on its surface during preparation that can be sensed using optical or other means. This signal can then be used to direct the first laser to the appropriate point on the surface for subsequent processing. In this way, pattern information need only be supplied to the second laser. Alternatively, the same positional information can be supplied via a computer program to both processing and preprocessing lasers.

Embodiments of the invention will now be described by way of example only with reference to the accompanying drawings in which.

Figure 1:
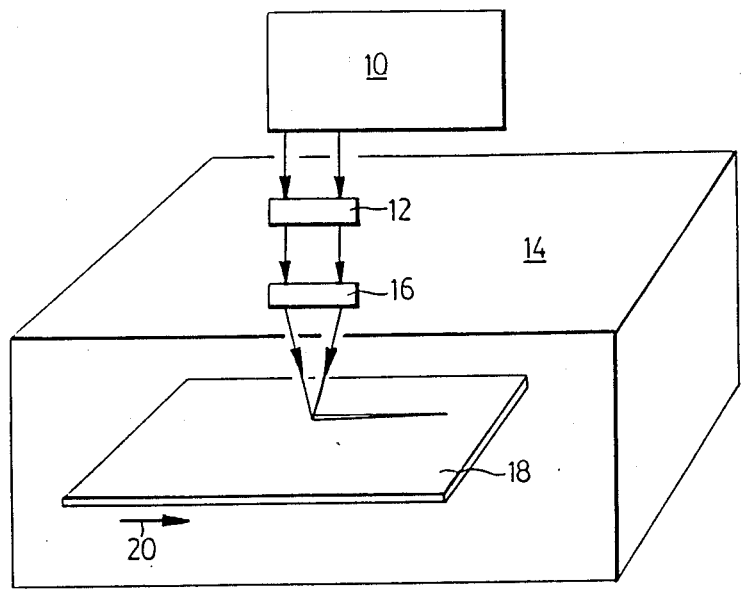
FIG. 1 is a schematic illustration of a system for preparation of a surface using pulsed laser radiation.

Referring to FIG. 1, a laser (10) emits pulses of coherent radiation of a predetermined wavelength through a window (12) in a container (14). The laser (10) is an excimer laser having an average power output of 10 watts and a repetition rate of 30 hz. The wavelength radiation emitted by laser (10) is in the ultraviolet range typically 240 nm or 308 nm.

The radiation beam from the laser (10) is focussed by a lens (16) to impinge on the surface of a sheet material (18) within the container (14). The material is mounted to translate relative to the laser beam as indicated by the arrow (20).

In operation, the sheet of material (18) is positioned so that upon translation in the direction of the arrow (20) the radiation beam from the laser (10) will impinge upon the sheet along a path representing the area to be processed. The laser (10) is then operated and successive pulses of the radiation from the laser (10) impinge upon the surface in an overlapping pattern. The reflectivity of the surface to the wavelength of the radiation emitted from the laser (10) is such that the radiation is absorbed and a thin surface layer of the material is melted and evaporated. This produces a roughening of the surface in the localized region in which the beam of radiation is impinging upon the circuit. The elevated temperature of the surface induced by the irradation results in the formation of surface compounds such as oxides that are efficient absorbers of infrared and visible radiation. The atmosphere within the container (14)

may be chosen to promote the generation of the surface compounds, for example, by utilizing an enriched oxygen atmosphere or by provision of a chemical component that reacts with the surface to produce the requisite compound.

After preparation by the system of FIG. 1, the surface of the material (18) is able to absorb the infrared radiation produced by the higher powered $CO_2$ lasers or YAG lasers along the track produced by the UV laser (10). The laser (10) has in fact reduced the reflectivity of the surface in the area treated so that the efficiency of absorption of the infrared radiation is enhanced.

Tests conducted on copper using an excimer laser to prepare the surface have shown an improvement in the absorption of infrared radiation from 3½ with a conventional, untreated copper surface to between 60 and 70% after treatment. After treatment by the excimer laser noted above, cutting rates from between 20 and 50 inches per minute were obtained on a copper sample having a thickness of 1 mm utilizing a 1200 watt continuous wave carbon dioxide laser. The quality of the cut was equivalent to that obtained with conventional mechanical cutting apparatus.

The technique may be applied to materials that exhibit a high reflectivity at one wavelength but a reduced reflectivity at a different wavelength. Most metals will exhibit a high reflectivity at the infrared wavelength and a substantially reduced reflectivity at the ultraviolet wavelength. Thus, a techique that prepares the surface of the material by using a shorter wavelength radiation prior to processing with an infrared radiation may be used successfully on metals such as aluminum, silver, brass, titanium, stainless steel and alloys such as 20/24 aluminum as well as the copper exemplified above.

Whilst a pulsed laser has been described for the preparation of the surface, it will be appreciated that a continous wave laser of the appropriate wavelength could be utilized.

The result is also non-specific to the excimer. For example, one could use a doubled or tripled YAG system for preprocessing.

Figure 2:
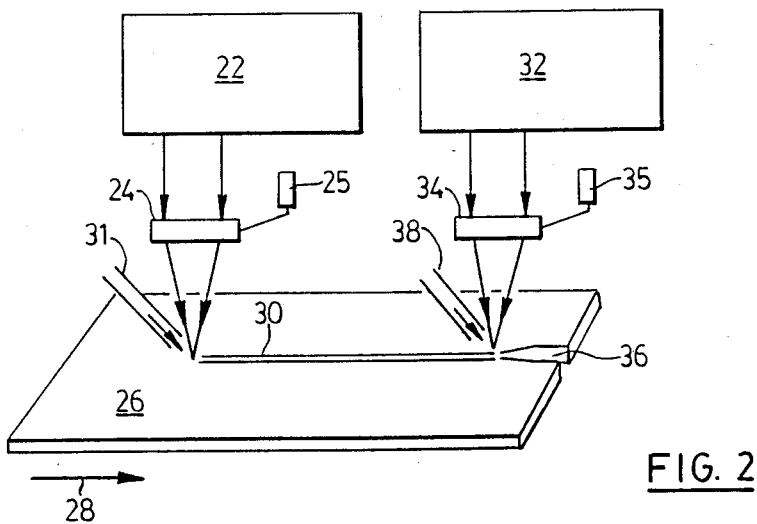
FIG. 2 is a schematic illustration of a system for preparation of a metal surface in air and subsequent processing with another laser.

FIG. 2 shows an alternative arrangement in which the preparation and subsequent processing of the material are performed in a single pass. In FIG. 2 an excimer laser (22) is focussed by a lens (24) onto the surface of a copper sheet (26). The sheet (26) is moved in the direction indicated by arrow (28) so that a track (30) is formed on the surface of the material. Oxygen is fed to the area impinged by the laser beam through a nozzle (31) to enhance the formation of oxides on the surface of the material (26).

An infrared laser (32) is aligned with the excimer laser (22) so that the track generated by the laser (22) passes beneath the beam generated by the infrared laser (32) and focussed through the lens (34). The infrared laser produces a higher power beam capable of producing sufficient energy to cut the sheet of material (26). As the track (30) passes beneath the beam, the oxidation and physical roughening of the surface enhances the absorption of the infrared radiation so that a discontinuity (36) is formed in the material. Auxilliary gases to optimize the efficiency and quality of the processing such as oxen or argon are fed through nozzle (38) onto the area impinged by the radiation beam. It will be understood that the two lasers (32), (22), are fixed relative to one another when a straight line is to be processed but, as indicated at (25) and (35), beam deflection devices may be incorporated to permit independent movement when a non linear track is to be generated and followed.

Figure 3:
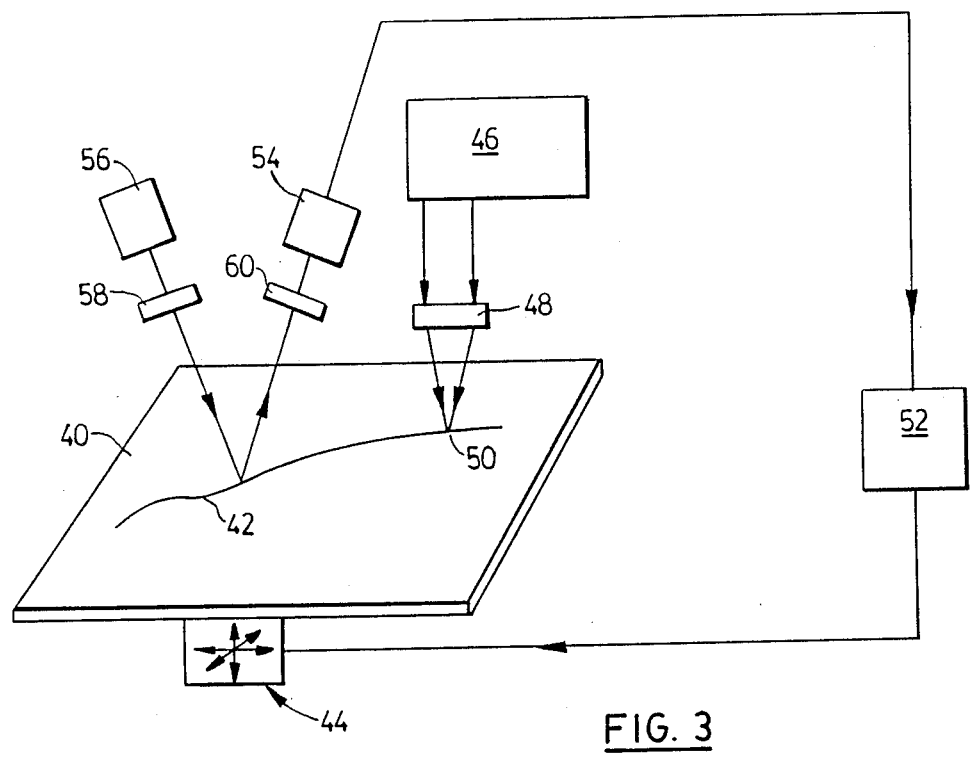
FIG. 3 shows a schematic illustration of a system whereby a track or pattern produced by the system of FIG. 1 is used to guide another laser

In the arrangement of FIG. 3, a sheet of material (40) is initially prepared using the apparatus shown in FIG. 1 so that a track (42) of an appropriate contour is formed on the surface of the material (40). The material is then mounted on a cutting table capable of movement about three orthogonal axes indicated at (44). An infrared laser (46) is positioned to generate a beam of infrared radiation through a lens (48) that impinges at a focussed area on the surface of the material (40) as indicated by reference numeral (50). Movement of the table (24) is controlled through an automated control system (52) that receives input from a light sensor (54). A light source (56) directs a beam of light through a lens (58) onto the surface of material from where it is reflected through an optical system (60) and into the sensor (54). Because of the reduced reflectivity of the track (42) relative to the rest of the surface, the control system (52) is operable to follow the track (42) by detecting changes in reflectivity at the sensor (54). The table thus moves the material (40) along the predetermined track so that the track is also followed by the laser (56) to cut the desired profile from the sheet of material.

It will be noted that with this arrangement, because of the low efficiency of unprepared surface material, any misalignment between the laser (46) and the track (42) will not result in an incorrect profile but will simply not produce a cut. This may also be used to reduce the precision of the focussing elements associated with the infrared laser as the cutting, or processing of the sheet material will be restricted to the area defined by the track rather than to the surrounding material.

Figure 4:
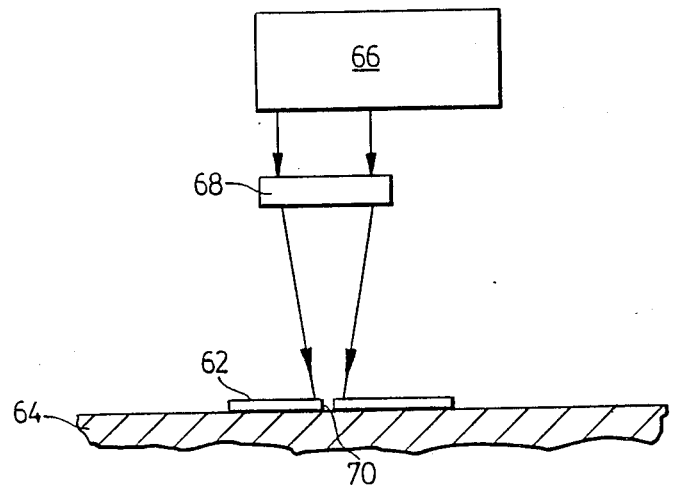
FIG. 4 is a schematic representation in cross section of a system whereby a pattern is generated by the system of FIG. 1 using a mask.

FIG. 4 shows an arrangement similar to FIG. 1 but in cross-section, in which a mask (62) is positioned on the surface of the material (64) before preparation by the excimer laser (66). The laser is focussed through a lens (68) to the surface of the material but an aperture (70) in the mask restricts the area of treatment to the surface lying in the aperture (70). This again avoids the need for fine focussing of the excimer laser where this may present a problem.

Whilst the processing has been described with the material moving and the laser fixed, it will be apparent that the sheet material may be stationary and the laser moved or scanned across the material. This is beneficial where large sheets of material are to be processed.

Similarly, a continuous track of pretreated surface may not be essential as in certain applications a discontinuous track may be preferable, for example where a line of perforations is required.

It will be seen, therefore, that by preparing the surface of a material with a laser of different wavelengths to that used to process the material, the reflectivity of the material may be reduced to permit the subsequent processing at relatively high efficiency. The subsequent processing may include cutting as described above, but may also be welded or surface heat treated. In the case of welding, the edge of a material sheet or precut profile may be prepared by passing beneath the excimer laser as described above and subsequently welded to an adjacent sheet by the carbon dioxide laser. Alternatively, it would be appreciated that where a profile has to be cut prior to welding, the pretreatment will facilitate both cutting and subsequent welding of the material.

What we claim is:

1. A work piece having a surface exhibiting a high reflectivity to laser radiation of a first wavelength and having formed thereon by a laser of a second wavelength a pattern of reduced reflectivity relative to the reflectivity of the first laser to enhance coupling between said surface and laser radiation of said first wavelength, said pattern exhibiting an increased surface roughness relative to said surface formed by evaporation and melting of said surface by said laser of said second wavelength.

2. A workpiece according to claim 1 wherein said pattern is an elongate track.

3. A workpiece according to claim 1 wherein said pattern is defined by a physical alteration of said surface.

4. A workpiece according to claim 1 wherein said pattern is defined by a chemical change to said surface.

5. A workpiece according to claim 4 wherein said pattern is defined by a physical alteration as well as said chemical change.

6. A workpiece according to claim 2 wherein said track extends between spaced locations on the periphery of said workpiece.

7. A workpiece according to claim 6 wherein said spaced locations are on opposite edges of said workpiece.

8. A workpiece according to claim 2 wherein said track is located on an edge of said workpiece.

9. A workpiece according to claim 1 wherein said pattern is formed by overlapping pulses of radiation from said laser of said second wavelength.

* * * * *